United States Patent [19]
Yokota et al.

[11] Patent Number: 5,952,428
[45] Date of Patent: Sep. 14, 1999

[54] GOLF BALL

[75] Inventors: Masatoshi Yokota; Seiichiro Endo, both of Shirakawa, Japan

[73] Assignee: Sumitomo Rubber Industries, Ltd., Hyogo-ken, Japan

[21] Appl. No.: 08/944,293

[22] Filed: Oct. 6, 1997

Related U.S. Application Data

[63] Continuation of application No. 08/599,160, Feb. 9, 1996, abandoned.

[30] Foreign Application Priority Data

Feb. 10, 1995 [JP] Japan .................................. 7-046097

[51] Int. Cl.⁶ .................................................. A63B 37/12
[52] U.S. Cl. ......................... 525/221; 525/196; 525/201; 473/372; 473/378; 473/385
[58] Field of Search ..................................... 473/372, 378, 473/385; 525/196, 201, 221

[56] References Cited

U.S. PATENT DOCUMENTS

| | | |
|---|---|---|
| 3,819,768 | 6/1974 | Molitor . |
| 4,801,649 | 1/1989 | Statz ........................................ 525/221 |
| 4,884,814 | 12/1989 | Sullivan . |
| 4,911,451 | 3/1990 | Sullivan et al. . |
| 5,120,791 | 6/1992 | Sullivan . |
| 5,298,571 | 3/1994 | Statz ........................................ 525/221 |
| 5,324,783 | 6/1994 | Sullivan . |
| 5,328,959 | 7/1994 | Sullivan . |
| 5,415,937 | 5/1995 | Cardoniga et al. . |
| 5,490,673 | 2/1996 | Hiraoka . |
| 5,490,674 | 2/1996 | Hamada . |
| 5,605,968 | 2/1997 | Egashira ................................. 525/221 |
| 5,607,366 | 3/1997 | Yokota ................................... 473/377 |
| 5,656,695 | 8/1997 | Endo ...................................... 473/372 |
| 5,688,869 | 11/1997 | Sullivan ................................. 525/196 |

FOREIGN PATENT DOCUMENTS

| | | |
|---|---|---|
| 0661082 | 12/1993 | European Pat. Off. . |
| 2214515 | 1/1989 | United Kingdom . |
| 2247682 | 5/1991 | United Kingdom . |
| 2288604 | 4/1994 | United Kingdom . |

OTHER PUBLICATIONS

Grant & Hackh's Chemical Dictionary 5th Edition p. 23.
Research Dislosure No. 27103—(Nov. 1996)—Dupont.

*Primary Examiner*—David Buttner
*Attorney, Agent, or Firm*—Birch, Stewart, Kolasch & Birch, LLP

[57] ABSTRACT

The present invention provides a golf ball having excellent shot feel, controllability and durability as well as satisfactory flight performance. A cover of the golf ball is composed of a mixture of specific three resins (1), (2) and (3), wherein the total amount of the resin (1) and resin (2) is 60 to 83% by weight and the amount of the resin (3) is 17 to 40% by weight in the mixture as a main component, and wherein the amount of the resin (1) is 33 to 80% by weight and the amount of the resin (2) is 3 to 50% by weight in the total of the resin (1) and resin (2) and a stiffness of the cover composition is 1000 to 2000 kg/cm².

7 Claims, 1 Drawing Sheet

GOLF BALL

This application is a continuation, of application Ser. No. 08/599,160 filed on Feb. 9, 1996, now abandoned.

FIELD OF THE INVENTION

The present invention relates to a golf ball. More particularly, it relates to a golf ball having excellent shot feel, controllability and durability as well as satisfactory flight performance.

BACKGROUND OF THE INVENTION

Recently, an ionomer resin has widely been used as a base resin for a cover of golf balls (e.g. Japanese Laid-Open Patent Publication No. 49-27093). Particularly, the ionomer resin is exclusively used in a two-piece golf ball containing a solid core. This is because the ionomer resin is superior in rebound performance, cut resistance, etc. as well as processability.

However, a golf ball using the ionomer resin as the base resin of the cover is inferior in shot feel and controllability (ease of putting spin on the ball) in comparison with a thread wound golf ball using a balata (transpolyisoprene) as the base resin for the cover because the ionomer resin has high hardness and rigidity.

Therefore, various trials of softening the ionomer resin due to various means to improve shot feel and controllability have been made. However, there was a problem that rebound and flight performances are deteriorated by the softening and satisfactory results have not been obtained.

As described above, the golf ball using the ionomer resin as the base resin of the cover is inferior in shot feel and controllability. In addition, the attempts at improvements have not succeeded because of deterioration of rebound and flight properties.

OBJECTS OF THE INVENTION

In order to solve the above problem, the present inventors have intensively studied the base resin of the cover. As a result, it has been found that a golf ball having excellent shot feel, controllability and durability as well as satisfactory flight performance can be obtained by using a cover composition comprising a mixture of the following resin (1), resin (2) and resin (3) as a main component, wherein the total amount of the resin (1) and resin (2) is 60 to 83% by weight and the amount of the resin (3) is 17 to 40% by weight in the mixture, and wherein the amount of the resin (1) is 33 to 80% by weight and the amount of the resin (2) is 3 to 50% by weight in the total of the resin (1) and resin (2) and a stiffness of the cover composition is 1,000 to 2,000 kg/cm$^2$:

resin (1): an ionomer resin having a stiffness of 700 to 1,200 kg/cm$^2$, which is obtained by neutralizing a terpolymer of ethylene, methacrylic acid and acrylate with a zinc ion;

resin (2): an ionomer resin having a stiffness of 2,500 to 5,000 kg/cm$^2$, which is obtained by neutralizing a copolymer of ethylene and methacrylic or acrylic acid with a zinc ion; and resin (3): an ionomer resin having a stiffness of 2,300 to 5,000 kg/cm$^2$, which is obtained by neutralizing a copolymer of ethylene and methacrylic or acrylic acid with an alkaline metal ion.

A main object of the present invention is to provide a golf ball having excellent shot feel, controllability and durability as well as satisfactory flight performance.

This object as well as other objects and advantages of the present invention will become apparent to those skilled in the art from the following description with reference to the accompanying drawings.

SUMMARY OF THE INVENTION

Figure 1:
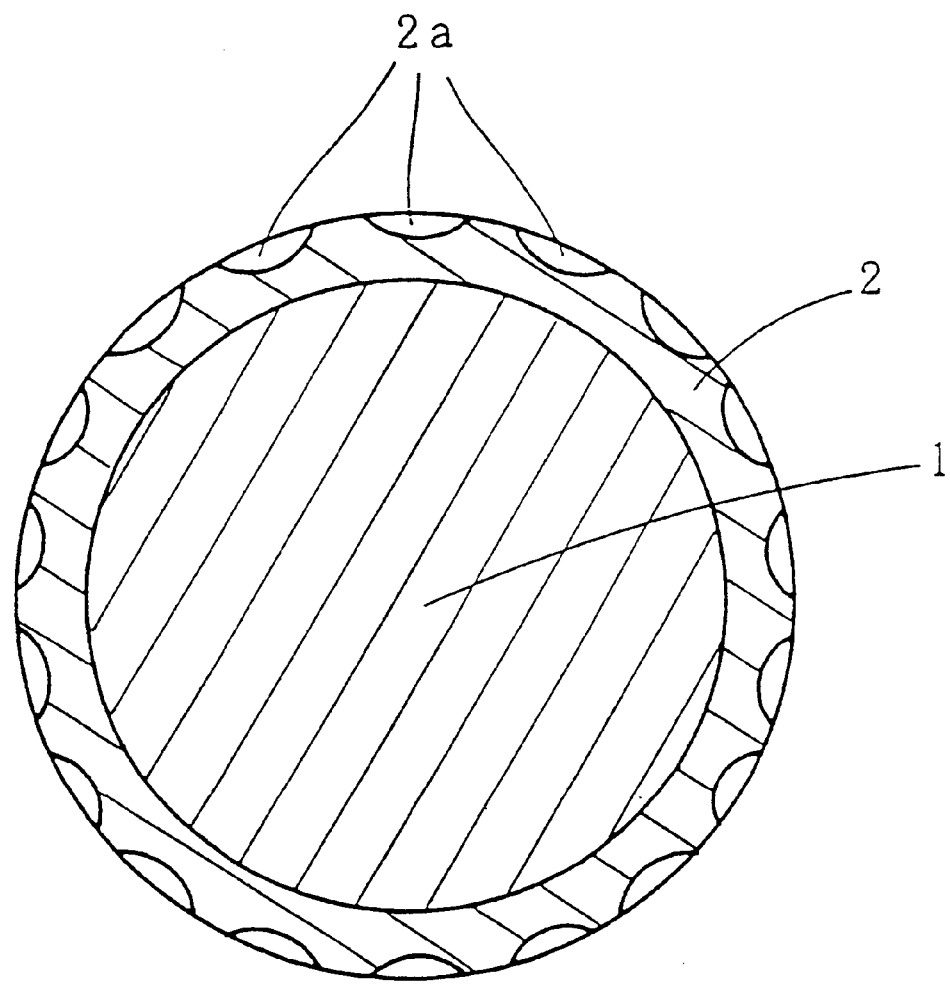
FIG. 1 is a schematic cross section illustrating one embodiment of the golf ball of the present invention.

The present invention provides a golf ball comprising a core and a cover covering the core, wherein the cover is prepared from a mixture of the following resin (1), resin (2) and resin (3) as a main component, and the total amount of the resin (1) and resin (2) is 60 to 83% by weight and the amount of the resin (3) is 17 to 40% by weight in the mixture, and the amount of the resin (1) is 33 to 80% by weight and the amount of the resin (2) is 3 to 50% by weight in the total of the resin (1) and resin (2) and a stiffness of the cover composition is 1,000 to 2,000 kg/cm$^2$:

resin (1): an ionomer resin having a stiffness of 700 to 1,200 kg/cm$^2$, which is obtained by neutralizing a terpolymer of ethylene, methacrylic acid and acrylate with a zinc ion;

resin (2): an ionomer resin having a stiffness of 2,500 to 5,000 kg/cm$^2$, which is obtained by neutralizing a copolymer of ethylene and methacrylic or acrylic acid with a zinc ion; and resin (3): an ionomer resin having a stiffness of 2,300 to 5,000 kg/cm$^2$, which is obtained by neutralizing a copolymer of ethylene and methacrylic or acrylic acid with an alkaline metal ion.

That is, in the present invention, the stiffness of the cover composition was adjusted to 1,000 to 2,000 kg/cm$^2$ by mixing the resin (1) having a low stiffness (700 to 2000 kg/cm$^2$) as a base ionomer resin neutralized with a zinc ion with the resin (2) and resin (3), which have a stiffness higher than of the resin (1), thereby making it possible to obtain a soft feel at the time of shot, which results in goof shot feel, large spin amount and good controllability. And besides, the durability was improved by using the resin (1) and resin (2), which are ionomer resins neutralized with a zinc ion, as the main material.

In addition, deterioration of the rebound performance is inhibited by mixing the resin (1) and resin (2), which are ionomer resins neutralized with a zinc ion, with a suitable amount of the resin (3) having high rebound performance as the ionomer resin neutralized with an alkaline metal ion such as sodium ion, potassium ion, lithium ion, etc.

DETAILED DESCRIPTION OF THE INVENTION

In the present invention, the reason why the total amount of the resin (1) and resin (2) is 60 to 83% by weight and the amount of the resin (3) is 17 to 40% by weight in the mixture of the resin (1), resin (2) and resin (3), which are used as the main component of the base resin of the cover, and the amount of the resin (1) is 33 to 80% by weight and the amount of the resin (2) is 3 to 50% by weight in the total of the resin (1) and resin (2) is as follows.

That is, when the total amount of the resin (1) and resin (2) is less than 60% by weight, the effect of improving shot feel, controllability and durability is not sufficiently developed. On the other hand, when the total amount of the resin (1) and resin (2) exceeds 83% by weight, rebound performance is deteriorated because of a decrease in the amount of the resin (3), which results in deterioration of flight performance. To the contrary, when the amount of the resin (3) exceeds 40% by weight, the effect of improving shot feel, controllability and durability is not developed sufficiently. On the other hand, when the amount of the resin (3) is less than 17% by weight, flight performance is deteriorated due to deterioration of rebound performance. It is particularly preferred that the total amount of the resin (1) and resin (2) is 70 to 80% by weight and the amount of the resin (3) is 20 to 30% by weight.

In addition, when the amount of the resin (1) is less than 33% by weight (i.e. the amount of the resin (2) is more than 50% by weight) in the total of the resin (1) and resin (2), the stiffness can not be lowered and, therefore, the effect of improving shot feel and controllability is not developed sufficiently. On the other hand, when the amount of the resin (1) is more than 80% by weight (i.e. the amount of the resin (2) is less than 3% by weight), the stiffness becomes too small and the golf ball becomes soft, which results in heavy shot feel. In addition, rebound performance is deteriorated and, therefore, flight performance is also deteriorated.

In the present invention, the resin (1) which becomes a constituent component of the base resin of the cover is an ionomer resin having a stiffness of 700 to 1,200 kg/cm$^2$, preferably 800 to 1,000, which is obtained by neutralizing a terpolymer of ethylene, methacrylic acid and acrylate with a zinc ion. The reason why this resin (1) requires the stiffness of 700 to 1200 kg/cm$^2$ is as follows. That is, when the stiffness of the resin (1) is less than 700 kg/cm$^2$, the stiffness of the cover is too small and rebound performance is deteriorated, which results in deterioration of flight performance. On the other hand, when the stiffness of the resin (1) exceeds 1200 kg/cm$^2$, it is difficult to improve controllability while maintaining good flight performance.

Examples of the resin (1) include Hi-milan 1855 (trade name) which is commercially available from Mitsui Du Pont Polychemical Co., Ltd.

In addition, the resin (2) is an ionomer resin having a stiffness of 2,500 to 5,000 kg/cm$^2$, preferably 2,500 to 4,500, which is obtained by neutralizing a copolymer of ethylene and methacrylic or acrylic acid with a zinc ion, and it mainly compensate the stiffness when the stiffness of the resin (1) is small. The reason why this resin (2) requires the stiffness of 2500 to 5000 kg/cm$^2$ is as follows. That is, when the stiffness of the resin (2) is less than 2500 kg/cm$^2$, the stiffness of the resin (1) can not be compensated sufficiently and, therefore, flight performance of the golf ball is deteriorated. On the other hand, when the stiffness of the resin (2) exceeds 5000 kg/cm$^2$, shot feel and controllability of the golf ball is inferior.

Examples of the resin (2) include Hi-milan 1706, Hi-milan AM7315, Hi-milan AM7317 and Hi-milan 1557 (trade name), which are commercially available from Mitsui Du Pont Polychemical Co., Ltd.; Iotek 7010 (trade name) which is commercially available from Exxon Chemical Co.; etc.

The resin (3) is an ionomer resin having a stiffness of 2,300 to 5,000 kg/cm$^2$, preferably 2,500 to 4,500, which is obtained by neutralizing a copolymer of ethylene and methacrylic or acrylic acid with an alkaline metal ion, and it mainly have an action of enhancing rebound performance to improve the flight performance. The reason why the resin (3) requires the stiffness of 2,300 to 5,000 kg/cm$^2$ is as follows. That is, when the stiffness of the resin (3) is less than 2300 kg/cm$^2$, the rebound performance can not be enhanced sufficiently. On the other hand, when the stiffness of the resin (3) exceeds 5000 kg/cm$^2$, shot feel and controllability of the golf ball is inferior.

Examples of the resin (3) include Hi-milan 1605 (Na), Hi-milan 1555 (Na), Hi-milan 1707 (Na), Hi-milan AM7318 (Na) and Hi-milan MK7320 (K) (trade name), which are commercially available from Mitsui Du Pont Polychemical Co.; Surlyn 8920 (Na), Surlyn 8940 (Na), Surlyn AD8512 (Na), Surlyn 7930 (Li) and Surlyn 7940 (Li) (trade name), which are commercially available from Du Pont U.S.A. Co.; Iotek 8000 (trade name) which is commercially available from Exxon Chemical Co.; etc. Na, K and Li, which are described in parentheses after the trade name of the above ionomer resin indicate their neutralizing metal ion species.

In the present invention, it is necessary that the base resin of the cover is composed of a mixture of the resin (1), resin (2) and resin (3) as the main component and the cover composition containing them has a stiffness of 1,000 to 2,000 kg/cm$^2$. This reason is as follows. That is, when the stiffness of the cover composition is less than 1,000 kg/cm$^2$, the cover is too soft and rebound performance is deteriorated, which results in deterioration of flight performance. On the other hand, when the stiffness of the cover composition exceeds 2,000 kg/cm$^2$, it is impossible to obtain a suitable back spin amount and, therefore, controllability and shot feel is inferior. More preferred stiffness of this cover composition is 1,200 to 1,700 kg/cm$^2$. The mixture of the resin (1), resin (2) and resin (3) occupies a main part of the above cover composition. In most cases, a small amount of a pigment (e.g. titanium dioxide, etc.) is merely added and, therefore, the stiffness of the cover composition is substantially the same as that of the mixture of the resin (1), resin (2) and resin (3).

Considering the cover composition, which contains the mixture of the resin (1), resin (2) and resin (3) as the main component of the base resin, in view of the hardness, it is preferred that the resin (1) has a Shore D hardness of 45 to 59, the resin (2) has a Shore D hardness of 61 to 70, the resin (3) has a Shore D hardness of 61 to 70, and the cover has a Shore D hardness of 50 to 60.

That is, when the Shore D hardness of the resin (1) is less than 45, the cover is too soft and rebound performance is inferior. On the other hand, when the Shore D hardness of the resin (1) exceeds 59, the cover is too hard and it is difficult to obtain the desired hardness. When the Shore D hardness of the resin (2) is less than 61, the cover is too soft and the rebound performance is inferior. On the other hand, when the Shore D hardness of the resin (2) exceeds 70, the cover is too hard and, therefore, shot feel and controllability is inferior. When the Shore D hardness of the resin (3) is less than 61, the cover is too soft and it is impossible to sufficiently improve the rebound performance. On the other hand, when the Shore D hardness of the resin (3) exceeds 70, the cover is too hard and, therefore, shot feel and controllability is inferior. When the Shore D hardness of the cover is less than 50, the cover is too soft and rebound performance is inferior, which results in deterioration of flight performance. On the other hand, when the Shore D hardness of the cover exceeds 60, the cover is too hard and, therefore, controllability and shot feel is inferior.

In the present invention, it is possible to obtain desired characteristics by mixing the above resin (1), resin (2) and resin (3). They are normally mixed with heating at 150 to 260° C. for 0.5 to 15 minutes, using internal mixers such as kneading type twin-screw extruder, Banbury, kneader, etc.

If necessary, various additives such as pigments, dispersants, antioxidants, UV absorbers, photostabilizers, etc. can be formulated in the cover composition used for forming a cover in the present invention, in addition to the mixture of the above resin (1), resin (2) and resin (3). In addition, other resin can also be added unless characteristics of the mixture of the resin (1), resin (2) and resin (3) are not deteriorated. When the other resin is added to form a base resin of the cover as described above, the proportion of the mixture of the resin (1), resin (2) and resin (3) is preferably not less than 70% by weight, particularly not less than 80% by weight. In the present invention, "the mixture of the resin (1), resin (2) and resin (3) is used as the main component of the base resin of the cover" means a case that the base resin of the cover is composed of the mixture of the resin (1), resin (2) and resin (3) alone and a case that the other resin is added to the above mixture to form the base resin of the cover. In the present invention, the resin (1), resin (2) and resin (3) may be previously mixed, followed by mixing with the other resin. In addition, the mixture may be mixed with the other additives when the cover composition is prepared. In addition, the thickness of the cover is preferably 0.5 to 3.0 mm, particularly 1.4 to 2.5 mm.

Further, a golf ball can be obtained by covering the cover on the core. As the core, any of a core for solid golf ball (solid core) and a core for thread wound golf ball (thread wound core) can be used.

The sold core may be not only core of a two-piece golf ball, but also core of multi-layer golf ball of two or more layers. For example, as the core for a two-piece golf ball, those obtained by subjecting a rubber composition to a press vulcanization to compress with heating (e.g. at a temperature of 140 to 170° C. for 10 to 40 minutes) into a spherical vulcanized article can be used, the rubber composition being prepared by formulating 10 to 60 parts by weight of at least one vulcanizing agent (crosslinking agent) of α, β-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumylperoxide, etc.) and 0.1 to 1 parts by weight of an antioxidant, based on 100 parts by weight of polybutadiene. In addition, as the core of an one-layer structure, an uniform core whose difference in hardness (JIS-C hardness) of any part is within five is preferred.

The thread wound core is composed of a center and a thread rubber wound on the center. As the center, any of a liquid center and a rubber center can be used. As the rubber center, there can be used those obtained by vulcanizing the same rubber composition as that of the solid core.

The thread rubber may be those which have hitherto been used, for example, those obtained by vulcanizing a rubber composition wherein an antioxidant, a vulcanizing accelerator and sulfur are formulated in a natural rubber or a combination of a natural rubber and synthetic polyisoprene. The core is not limited to the solid core and thread wound core.

A method of covering the cover on the core is not specifically limited, but may be a normal method. For example, there can be used a method comprising molding a composition for the cover prepared by formulating a suitable amount of a requisite additive in the above mixture of the resin (1), resin (2) and resin (3) into a semi-spherical half-shell in advance, covering a core with two half-shells and then subjecting to a pressure molding at 130 to 170° C. for 1 to 15 minutes, or a method comprising injection molding the composition for the cover directly on the core to cover the core. In case of cover molding, a dimple may be formed on the surface of the ball, if necessary. Further, if necessary, a paint or marking may be provided after cover molding.

The structure of the golf ball of the present invention will be explained with reference to the accompanying drawing. FIG. 1 is a schematic cross section illustrating one embodiment of the golf ball of the present invention. The golf ball shown in FIG. 1 is a two-piece solid golf ball comprising a core 1 of a vulcanized molded product and a cover 2 for covering the core. The core 1 is referred to as a solid core but is not specifically limited, for example, a vulcanized molded product of a rubber composition comprising polybutadiene as a main material as described above. The cover 2 for covering the core is a cover composition, which contains the above mixture of the resin (1), resin (2) and resin (3). In addition, 2a is a dimple provided on the cover 2. In the golf ball shown in FIG. 1, the core 1 is composed of a vulcanized molded product of a single-layer rubber, but it may also be a two-layer solid core obtained by further forming an outer core of a vulcanized molded product of a rubber composition comprising polybutadiene as a main material around an inner core of a vulcanized molded product of a rubber composition comprising polybutadiene as a main material, or a thread wound core comprising a center and a thread rubber wound thereon.

A suitable number/embodiment of dimples 2a are optionally provided on the cover 2 of the golf ball so that desired characteristics may be obtained. In addition, painting or marking is optionally provided on the surface of the golf ball.

As described above, according to the present invention, there is provided a golf ball having excellent shot feel, controllability and durability as well as satisfactory flight performance.

EXAMPLES

The following Examples and Comparative Examples further illustrate the present invention in detail but are not to be construed to limit the scope thereof.

Examples 1 to 6 and Comparative Examples 1 to 4

Golf balls of Examples 1 to 6 and Comparative Examples 1 to 4 were produced through the following processes (a) to (c).

(a) Production of core

A rubber composition prepared by formulating 30 parts by weight of zinc acrylate, 20 parts by weight of zinc oxide, 1.5 parts by weight of dicumylperoxide and 0.5 parts by weight of an antioxidant [Yoshinox 425 (trade name), manufactured by Yoshitomi Seiyaku Co., Ltd.] in 100 parts by weight of polybutadiene [BR-01 (trade name), manufactured by Japan Synthetic Rubber Co., Ltd.] was heating at 140° C. for 30 minutes, followed by heating at 170° C. for 10 minutes to obtain a vulcanized solid core. The average diameter of the resulting core was 38.9 mm. In addition, the hardness measured at any position of the resulting core using a JIS-C type hardness tester was within a range of 78±3.

(b) Production of Cover Composition

The formulation components shown in Tables 1 to 2 were mixed using a kneading type twin-screw extruder to obtain a pelletized composition for the cover. Further, the cover composition to be used for the golf balls of Examples 1 to 6, stiffness and Shore D hardness are shown in Table 1. The cover composition to be used for the golf balls of Comparative Examples 1 to 4, stiffness and Shore D hardness are shown in Table 2. In addition, the amount of each component described in the tables is represented by parts by weight. In the tables, the resin (1), resin (2) and resin (3) are represented by the trade name, and the details will be explained at the back of Table 2 in order.

The extrusion conditions are as follows: a screw diameter: 45 mm; a screw revolution per minute: 200 rpm; a screw L/D: 35. The formulation components were heated at 220 to 260° C. at the die position of the extruder. The measuring methods of the stiffness and Shore D hardness are as follows.

Stiffness: It is measured according to ASTM D-747 after a sheet having a thickness of about 2 mm obtained by heat-press molding is preserved at 23° C. for two weeks.

Shore D It is measured according to ASTM D-2240 after a sheet having a thickness of about 2 mm obtained by heat-press molding is preserved at 23° C. for two weeks.

Among the cover compositions to be used for the golf balls of Comparative Examples 1 to 4, typical one will be explained. The cover composition of Comparative Example 1 is a cover composition wherein only a high-rigid ionomer resin is used as the base resin, and the cover composition of Comparative Example 1 corresponds to a conventional standard composition for ionomer cover. The golf ball of Comparative Example 1 using this cover composition is a golf ball for a criterion of comparison.

(c) Production of Golf Ball

The cover composition of the above item (b) was injection-mold directly on the solid core of the above item (a) to cover the solid core. Then, the resulting golf ball was coated with a paint to obtain a coated golf ball having an outer diameter of 42.7 mm and a ball weight of 45.4 g.

The ball compression (PGA), rebound coefficient, durability, low-temperature durability, flight distance (carry), spin amount and shot feel of the golf ball thus obtained were examined The ball compression (POA), rebound coefficient, durability, low-temperature durability, flight distance (carry), spin amount and shot feel of the golf balls of Examples 1 to 6 are shown in Table 3, and those of the golf balls of Comparative Examples 1 to 4 are shown in Table 4. Further, the measurement or evaluation method of the above ball compression (PGA), rebound coefficient, durability, low-temperature durability, flight distance (carry), spin amount and shot feel is as follows.

Rebound Coefficient:

It is determined from a ball velocity after hitting a cylindrical article (198.4 g) against the golf ball at a speed of 45 m/second.

Durability:

A No. 1 wood club is fit on a swing robot manufactured by True Temper Co., and then a golf ball is hit with the club at a head speed of 45 m/second and the number of times until breakage was arisen was measured. The resulting value is indicated as a durability index in case of the number of Comparative Example 1 as a criterion for comparison being 100.

Low-Temperature Durability:

A golf ball is cooled to −30° C. and the number of times until breakage is arisen is measured according to the same manner as that used in case of the durability. The resulting value is indicated as a durability index in case of the number of Comparative Example 1 under this condition being 100.

Flight Distance:

A golf ball is hit with a No. 1 wood club at a head speed of 45 m/second using a swing robot manufactured by True Temper Co., and the distance to the falling point is measured.

Spin Amount:

A golf ball is hit with a No. 9 iron club at a head speed of 34 m/second using a swing robot manufactured by True Temper Co., and the spin amount is determined by taking a photograph of the hit golf ball.

Shot Feel:

It is evaluated with 10 top professional golfers according to a practical hitting test. The evaluation criteria are as follows. The results shown in the Tables below are based on the fact that not less than 8 out of 10 professional golfers evaluated with the same criterion about each test item.

Evaluation Criteria

◯: Excellent

Δ: Ordinary

X: Inferior

TABLE 1

| | | | Example No. | | | |
|---|---|---|---|---|---|---|
| | 1 | 2 | 3 | 4 | 5 | 6 |
| Resin (1): | | | | | | |
| Hi-milan 1855✕ 1 | 80 | 75 | 70 | 40 | 55 | 75 |
| Resin (2): | | | | | | |
| Hi-milan 1706✕ 2 | 0 | 0 | 5 | 0 | 5 | 5 |
| Hi-milan 1557✕ 3 | 3 | 5 | 0 | 40 | 0 | 0 |
| Resin (3): | | | | | | |
| Hi-milan 1555✕ 4 | 17 | 0 | 0 | 20 | 40 | 0 |
| Hi-milan 1605✕ 5 | 0 | 20 | 25 | 0 | 0 | 0 |
| Surlyn 7940 ✕ 6 | 0 | 0 | 0 | 0 | 0 | 20 |
| Titanium dioxide | 2 | 2 | 2 | 2 | 2 | 2 |
| Stiffness (kg/cm$^2$) | 1200 | 1600 | 1800 | 1900 | 1700 | 1700 |
| Shore D hardness | 56 | 58 | 59 | 60 | 58 | 58 |

TABLE 2

| | Comparative Example No. | | | |
|---|---|---|---|---|
| | 1 | 2 | 3 | 4 |
| Resin (1): | | | | |
| Hi-milan 1855✕ 1 | 0 | 35 | 75 | 40 |
| Resin (2): | | | | |
| Hi-milan 1706✕ 2 | 50 | 0 | 0 | 40 |
| Hi-milan 1557✕ 3 | 0 | 5 | 20 | 0 |
| Resin (3): | | | | |
| Hi-milan 1555✕ 4 | 0 | 60 | 0 | 0 |
| Hi-milan 1605✕ 5 | 50 | 0 | 5 | 20 |
| Titanium dioxide | 2 | 2 | 2 | 2 |
| Stiffness (kg/cm$^2$) | 3600 | 2000 | 1400 | 2500 |
| Shore D hardness | 68 | 60 | 57 | 62 |

1: Hi-milan 1855 (trade name), ionomer resin obtained by neutralizing a terpolymer of ethylene, methacrylic acid and acrylate with a zinc ion, manufactured by Mitsui Du Pont Polychemical Co., Ltd., stiffness: 890 kg/cm$^2$, Shore D hardness: 55

2: Hi-milan 1706 (trade name), ionomer resin obtained by neutralizing a copolymer of ethylene and methacrylic acid with a zinc ion, manufactured by Mitsui Du Pont Polychemical Co., Ltd., stiffness: 3400 kg/cm², Shore D hardness: 61

3: Hi-milan 1557 (trade name), ionomer resin obtained by neutralizing a copolymer of ethylene and methacrylic acid with a zinc ion, manufactured by Mitsui Du Pont Polychemical Co., Ltd., stiffness: 2600 kg/cm², Shore D hardness: 57

4: Hi-milan 1555 (trade name), ionomer resin obtained by neutralizing a copolymer of ethylene and methacrylic acid with a sodium ion, manufactured by Mitsui Du Pont Polychemical Co., Ltd., stiffness: 2600 kg/cm², Shore D hardness: 57

5: Hi-milan 1605 (trade name), ionomer resin obtained by neutralizing a copolymer of ethylene and methacrylic acid with a sodium ion, manufactured by Mitsui Du Pont Polychemical Co., Ltd., stiffness: 3800 kg/cm², Shore D hardness: 62

6: Surlyn 7940 (trade name), ionomer resin obtained by neutralizing a copolymer of ethylene and methacrylic acid with a lithium ion, manufactured by Du Pont U.S.A. Co, stiffness: 4200 kg/cm², Shore D hardness: 63

TABLE 3

|  | Example No. | | | | | |
|---|---|---|---|---|---|---|
|  | 1 | 2 | 3 | 4 | 5 | 6 |
| Ball compression (PGA) | 85 | 87 | 88 | 89 | 88 | 87 |
| Rebound coefficient | 0.767 | 0.768 | 0.769 | 0.770 | 0.770 | 0.769 |
| Durability (index) | 280 | 250 | 250 | 230 | 250 | 250 |
| Low-temperature durability (index) | 220 | 200 | 180 | 200 | 160 | 180 |
| Flight distance (yard) | 228 | 229 | 229 | 230 | 230 | 229 |
| Spin amount (rpm) | 7400 | 7200 | 7100 | 7100 | 7200 | 7200 |
| Shot feel | ⊚ | ⊚ | ⊚ | ⊚ | ⊚ | ⊚ |

TABLE 4

|  | Comparative Example No. | | | |
|---|---|---|---|---|
|  | 1 | 2 | 3 | 4 |
| Ball compression (PGA) | 102 | 89 | 86 | 94 |
| Rebound coefficient | 0.781 | 0.772 | 0.765 | 0.774 |
| Durability (index) | 100 | 200 | 230 | 150 |
| Low-temperature durability (index) | 100 | 80 | 200 | 140 |
| Flight distance (yard) | 233 | 230 | 225 | 231 |
| Spin amount (rpm) | 5800 | 6800 | 7100 | 6200 |
| Shot feel | × | Δ | ⊚ | × |

As is apparent from a comparison between ball characteristics of the golf balls of Examples 1 to 6 shown in Table 3 and those of the golf balls of Comparative Examples 1 to 4 shown in Table 4, the golf balls of Examples 1 to 6 of the present invention were superior in shot feel, controllability, durability and low-temperature durability. In addition, the spin amount was large and the flight distance (228 to 230 yards) attained a satisfactory level To the contrary, the golf ball of Comparative Example 1 attained a large flight distance because only a high-rigid ionomer resin is used as the base resin of the cover, but was inferior in short feel and controllability. It was also inferior in durability and low-temperature durability to the golf balls of Examples 1 to 6.

In addition, the golf ball of Comparative Example 2 attained a large flight distance because it contains 60% by weight of the resin (3) which is an ionomer resin neutralized with a sodium ion as the cover resin of the cover, but was inferior in durability to the golf balls of Examples 1 to 6. Shot feel and controllability did not attain a satisfactory level.

The golf ball of Comparative Example 3 attained a small flight distance because the amount of the resin (3) as an ionomer resin neutralized with a sodium ion is small such as 5% by weight. The golf ball of Comparative Example 4 attained a large flight distance because the stiffness of the cover composition is large, but was inferior in durability and low-temperature durability to the golf balls of Examples 1 to 6. In addition, the shot feel and controllability were also inferior.

What is claimed is:

1. A golf ball consisting essentially of a core and a cover covering the core, wherein said cover is prepared from a mixture of the following resin (1), resin (2) and resin (3) as a main component; the total amount of resin (1) and resin (2) being 60 to 83% by weight; the amount of resin (3) being 17 to 40% by weight in the mixture; and the amount of resin (1) being 33 to 80% by weight and the amount of resin (2) being 3 to 50% by weight based on the total amount of all resins in the cover said cover has a stiffness of 1,000 to 2,000 kg/cm²; and said cover has a Shore D hardness of 56 to 60, wherein resins (1), (2) and (3) are as follows:

resin (1): an ionomer resin having a stiffness of 890 to 1,200 kg/cm², which is obtained by neutralizing a terpolymer of ethylene, methacrylic acid and acrylate with a zinc ion;

resin (2): an ionomer resin having a stiffness of 2,500 to 5,000 kg/cm², which is obtained by neutralizing a copolymer of ethylene and methacrylic or acrylic acid with a zinc ion; and resin (3): an ionomer resin having a stiffness of 2,300 to 5,000 kg/cm², which is obtained by neutralizing a copolymer of ethylene and methacrylic or acrylic acid with an alkali metal ion.

2. The golf ball according to claim 1, wherein said resin (1) has a Shore D hardness of 45 to 59, the resin (2) has a Shore D hardness of 61 to 70, the resin (3) has a Shore D hardness of 61 to 70.

3. The golf ball according to claim 1, wherein the total amount of resin (1) and resin (2) is 70 to 80% by weight, and the amount of resin (3) is 20 to 30% by weight.

4. The golf ball according to claim 1, wherein the resin (1) has a stiffness of 1,000 to 1,200 kg/cm².

5. The golf ball according to claim 1, wherein the resin (2) has a stiffness of 2,500 to 4,500 kg/cm².

6. The golf ball according to claim 1, wherein the resin (3) has a stiffness of 2,500 to 4,500 kg/cm².

7. The golf ball according to claim 1, wherein the cover has a stiffness of 1,200 to 1,700 kg/cm².

* * * * *